US011483325B2

(12) United States Patent
Monsen et al.

(10) Patent No.: US 11,483,325 B2
(45) Date of Patent: Oct. 25, 2022

(54) DIFFERENCING ENGINE FOR DIGITAL FORENSICS

(71) Applicant: NETFLIX, INC., Los Gatos, CA (US)

(72) Inventors: Forest Monsen, Santa Cruz, CA (US); Kevin Glisson, San Francisco, CA (US)

(73) Assignee: NETFLIX, INC., Los Gatos, CA (US)

( * ) Notice: Subject to any disclaimer, the term of this patent is extended or adjusted under 35 U.S.C. 154(b) by 557 days.

(21) Appl. No.: 16/514,687

(22) Filed: Jul. 17, 2019

(65) Prior Publication Data
US 2020/0028867 A1 Jan. 23, 2020

Related U.S. Application Data

(60) Provisional application No. 62/699,711, filed on Jul. 17, 2018.

(51) Int. Cl.
*H04L 9/40* (2022.01)
*G06F 16/903* (2019.01)
*G06N 20/00* (2019.01)
*G06N 5/04* (2006.01)

(52) U.S. Cl.
CPC .... *H04L 63/1425* (2013.01); *G06F 16/90335* (2019.01); *G06N 5/04* (2013.01); *G06N 20/00* (2019.01)

(58) Field of Classification Search
None
See application file for complete search history.

(56) References Cited

U.S. PATENT DOCUMENTS

| 9,348,742 | B1 | 5/2016 | Brezinski |
| 9,747,325 | B2* | 8/2017 | Jolly ............ G06F 16/2365 |
| 10,530,749 | B1* | 1/2020 | Park ............ G06N 20/00 |
| 2007/0142055 | A1* | 6/2007 | Toivanen ...... H04H 60/44 455/450 |
| 2009/0119681 | A1* | 5/2009 | Bhogal ........ H04L 63/1416 719/318 |
| 2011/0247071 | A1 | 10/2011 | Hooks et al. |

(Continued)

OTHER PUBLICATIONS

International Search Report for application No. PCT/US2019/042285 dated Sep. 9, 2019.

(Continued)

*Primary Examiner* — Cai Y Chen
(74) *Attorney, Agent, or Firm* — Artegis Law Group, LLP

(57) ABSTRACT

In various embodiments, a forensic scoping application analyzes host instances in order to detect anomalies. The forensic scoping application acquires a snapshot for each host instance included in an instance group. Each snapshot represents a current operational state of the associated host instance. Subsequently, the forensic scoping application performs clustering operation(s) based on the snapshots to generate a set of clusters. The forensic scoping application determines that a first cluster in the set of clusters is associated with fewer host instances than at least a second cluster in the set of clusters. Based on the first cluster, the forensic scoping application determines that a first host instance included in the instance group is operating in an anomalous fashion. Advantageously, efficiently determining host instances that are operating in an anomalous fashion during a security attack can reduce the amount of damage caused by the security attack.

19 Claims, 5 Drawing Sheets

(56) References Cited

U.S. PATENT DOCUMENTS

| | | | | |
|---|---|---|---|---|
| 2012/0108266 A1* | 5/2012 | Clark | ............. | H04W 4/029 |
| | | | | 455/456.3 |
| 2013/0305357 A1* | 11/2013 | Ayyagari | ............. | H04L 41/069 |
| | | | | 726/22 |
| 2015/0101047 A1* | 4/2015 | Sridhara | ............. | G06F 21/577 |
| | | | | 726/23 |
| 2017/0124319 A1 | 5/2017 | Peleg et al. | | |
| 2021/0194907 A1* | 6/2021 | Bertiger | ............. | H04W 12/12 |
| 2021/0216630 A1* | 7/2021 | Karr | ............. | G06F 21/57 |

OTHER PUBLICATIONS

Velarde-Alvarado et al., "An unsupervised approach for traffic trace sanitization based on the entropy spaces", Telecommunication Systems, vol. 61, No. 3, Mar. 31, 2015, pp. 609-626.

* cited by examiner

DIFFERENCING ENGINE FOR DIGITAL FORENSICS

CROSS-REFERENCE TO RELATED APPLICATIONS

This application claims the priority benefit of the U.S. Provisional Patent Application having Ser. No. 62/699,711 and filed on Jul. 17, 2018. The subject matter of this related application is hereby incorporated herein by reference

BACKGROUND

Field of the Various Embodiments

Embodiments relate generally to computer science and digital forensic science and, more specifically, to a differencing engine for digital forensics.

Description of the Related Art

When a security attack is detected in a computing environment that includes multiple host instances computers, servers, cloud instances, virtual machines, etc.), determining which host instances have been compromised is critical to being able to mitigate any damage arising from the attack. For example, if an identity-theft malware attack were to successfully target a cloud-based online marketplace, then the users of the online marketplace would be at risk until all compromised host instances implemented in the online marketplace could be identified and the injected malware could be completely eradicated.

One way to identify compromised host instances is for a security team to manually inspect every host instance for signs of an attack or an attacker. In such an approach, upon identifying signs of an attack or an attacker in one of the host instances, the security team manually inspects the other host instances to identify additional host instances that exhibit the identified signs. While inspecting the various host instances for the identified signs, the security team may discover additional signs of the attack or attacker. In such situations, the security team also has to inspect different host instances to identify any host instances that exhibit the additional signs of the attack or attacker. The security team manually inspects host instances in this type of iterative fashion until the security team is unable to detect any additional signs of the attack or attacker. One drawback of this type of iterative inspection process is that, when the number of host instances requiring inspection is relatively large (e.g., 300), identifying compromised host instances can take several hours or even days. During a prolonged inspection process, an attack or attacker is usually able to continue stealing information, hurting business operations, damaging software, etc.

To reduce the time required to detect compromised host instances, a file integrity monitoring application can be preemptively deployed to each host instance in a given computing environment. In operation, the typical file integrity monitoring application compares the current state of a given host instance to a previously-captured and known "good" state for that host instance and issues an alert when a mismatch is detected between the two states. One drawback of file integrity monitoring applications is that the evaluation mechanism implemented in such applications is relatively inflexible. In particular, file integrity monitoring applications require foreknowledge of each host instance (e.g., a known good state). As a result, file integrity monitoring applications typically require extensive tuning and continued maintenance to effectively detect compromised host instances.

As the foregoing illustrates, what is needed in the art are more effective techniques for analyzing host instances in computing environments in order to mitigate security attacks.

SUMMARY

One embodiment sets forth a method for analyzing one or more host instances in a computing environment in order to mitigate a security attack. The method includes acquiring a first set of snapshots for a first instance group, where each snapshot represents a current operational state of a different host instance included in the first instance group; performing one or more clustering operations based on the first set of snapshots to generate a first set of clusters; and determining that a first host instance included in the first instance group is operating in an anomalous fashion based on a first cluster included in the first set of clusters that is associated with fewer host instances than at least a second cluster included in the first set of clusters.

At least one technical advantage of the disclosed techniques relative to the prior art is that, with the disclosed techniques, host instances exhibiting anomalous security-relevant behavior can be more efficiently and effectively identified. In that regard, because the disclosed techniques enable snapshots of the host instances to be automatically collected and evaluated to identify anomalies, the time required to identify compromised host instances can be reduced relative to prior art approaches. Reducing the time required to identify host instances that are compromised during a security attack typically can reduce the amount of damage caused by the attack. Further, unlike some prior art approaches, the queries used to generate the snapshots can be flexibly modified during a security attack to increase the effectiveness of detecting compromised host instances. These technical advantages represent one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
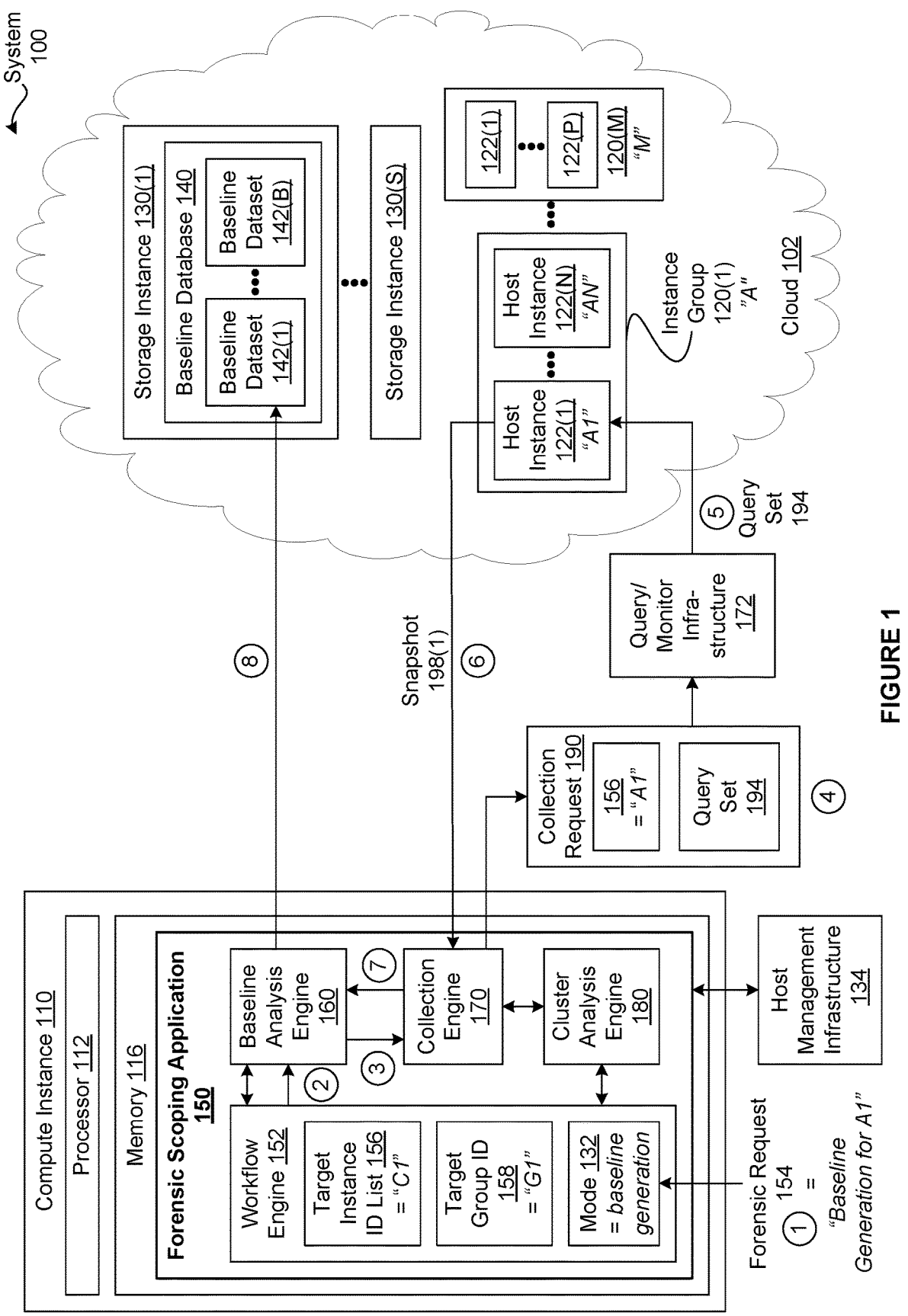
FIG. 1 is a conceptual illustration of a system configured to implement one or more aspects of the various embodiments.

In the following description, numerous specific details are set forth to provide a more thorough understanding of the various embodiments. However, it will be apparent to one skilled in the art that the inventive concepts may be practiced without one or more of these specific details.

Some large-scale service providers deploy applications and services across multiple regions and/or multiple clouds via virtual machine ("VM") images A VM image includes the information required to launch a VM in the cloud and allows the service provider to efficiently launch hundreds, or even thousands, of similarly configured VMs as host instances in any number of clouds. One challenge associated with deploying a large number of host instances in any computing environment is that when a security attack is detected in the computing environment, determining which of the host instances have been compromised can be problematic. And, until all of the compromised host images are identified, an attack or attacker is usually able to continue stealing information, hurting business operations, damaging software, etc.

One way to identify compromised host instances is for a security team to manually and iteratively inspect every host instance for signs of an attack or an attacker until the security team is unable to detect any additional signs of the attack or attacker. One drawback of this type of iterative inspection process is that, when hundreds or thousands of host instances require inspection, identifying compromised host instances can take several hours or even days.

To reduce the time required to detect compromised host instances, a file integrity monitoring application can be preemptively deployed to each host instance in a given computing environment. One drawback of file integrity monitoring applications is that the evaluation mechanism implemented in such applications is relatively inflexible. In particular, file integrity monitoring applications require foreknowledge of each host instance (e.g., a known good state). As a result, file integrity monitor applications typically require extensive tuning and continued maintenance to effectively detect compromised host instances.

With the disclosed techniques, however, a forensic scoping application can evaluate instance groups of host instances having similar behavior based on forensic commands that configure the behavior of a baseline analysis engine and a cluster analysis engine. Prior to a security attack, the baseline analysis engine can be configured to generate a baseline snapshot of security-relevant observations for a newly-deployed host instance included in a target instance group. During the security attack, the baseline analysis engine can be configured to generate snapshots for each of the host instances included in a target instance group for which a baseline snapshot exists. The baseline analysis engine compares each of the snapshots to the baseline snapshot to detect any security-relevant anomalies. The baseline analysis engine then generates an anomaly dataset specifying significant anomalies.

During the same security attack, the cluster analysis engine can be configured to evaluate the same or other instance groups, without using any previously generated data. In operation, the cluster analysis engine generates snapshots for each of the host instances included in a target instance group. Subsequently, the cluster analysis engine performs clustering operations based on the snapshots to detect any outliers with respect to security-relevant features. The cluster analysis engine then generates an anomaly dataset that specifies significant outliers. The anomaly datasets generated by the baseline analysis engine and the cluster analysis engine can subsequently be used to identify and remediate compromised host instances.

At least one technical advantage of the disclosed techniques relative to the prior art is that the forensic scoping application can be used to efficiently and effectively identify host instances exhibiting anomalous behavior during security attacks. In that regard, because the forensic scoping application automatically collects and evaluates the snapshots, the time required to identify compromised host instances during a security attack can be reduced relative to prior art approaches. Reducing the time required to identify host instances that are compromised during a security attack typically can reduce the amount of damage caused by the attack. In addition, unlike some prior art approaches, the queries used to generate the snapshots can be flexibly modified during a security attack to increase the effectiveness of detecting compromised host instances. Notably, using the forensic scoping engine is particular convenient for service providers that already deploy host instances in groups of related host instances (e.g., a group of VMs derived from the same VM image). These technical advantages represent one or more technological advancements over prior art approaches.

System Overview

FIG. 1 is a conceptual illustration of a system 100 configured to implement one or more aspects of the various embodiments. As shown, the system 100 includes, without limitation, a compute instance 110, a cloud 102, a host management infrastructure 134, and a query/monitor infrastructure 172. In alternate embodiments, the system 100 may include any number and types of compute instances 110 and any number and type of clouds 102. The cloud 102 is also referred to herein as a "cloud-based computing environment." For explanatory purposes, multiple instances of like objects are denoted with reference numbers identifying the object and parenthetical numbers identifying the instance where needed.

Any number of the components of the system 100 may be distributed across multiple geographic locations. In alternate embodiments, any number of the compute instance 110, the host management infrastructure 134, and/or the query/monitor infrastructure 172 may be implemented across any number and type of clouds (including the cloud 102) and any number of distributed computing environments in any combination.

As shown, the compute instance 110 includes, without limitation, a processor 112 and a memory 116. The processor 112 may be any instruction execution system, apparatus, or device capable of executing instructions. For example, the processor 112 could comprise a central processing unit ("CPU"), a graphics processing unit ("GPU"), a controller, a micro-controller, a state machine, or any combination thereof. The memory 116 stores content, such as software applications and data, for use by the processor 112 of the compute instance 110. In alternate embodiments, each of any number of compute instances 110 may include any number of processors 112 and any number of memories 116 in any combination. In particular, any number of the compute instances 110 (including one) may provide a multiprocessing environment in any technically feasible fashion.

The memory 116 may be one or more of a readily available memory, such as random access memory ("RAM"), read only memory ("ROM"), floppy disk, hard disk, or any other form of digital storage, local or remote. In some embodiments, a storage (not shown) may supplement or replace the memory 116. The storage may include any number and type of external memories that are accessible to the processor 112. For example, and without limitation, the storage may include a Secure Digital Card, an external Flash memory, a portable compact disc read-only memory (CD-ROM), an optical storage device, a magnetic storage device, or any suitable combination of the foregoing.

The compute instance 110 is configured to implement one or more applications or subsystems of applications. For explanatory purposes only, each application is depicted as residing in the memory 116 of a single compute instance 110 and executing on a processor 112 of the single compute instance 110. However, in alternate embodiments, the functionality of each application may be distributed across any number of other applications that reside in the memories 116 of any number of compute instances 110 and execute on the processors 112 of any number of compute instances 110 in any combination. Further, the functionality of any number of applications or subsystems may be consolidated into a single application or subsystem.

In particular, the compute instance 110 is configured to mitigate any damage arising from security attacks on host instances 122 included in computing environments that include multiple host instances 122, such as the cloud 102. Examples of security attacks include, without limitation, cryptomining attacks, data breaches, denial of service ("DoS") attacks, account or service hijacking, malware injections, etc. Each of the host instances 122 may be an instance of any type of self-contained execution environment that can be used to execute software applications. For instance, each of the host instances 120 may be a compute instance 110, a virtual machine, a container, etc.

When a security attack is detected in a computing environment that includes multiple host instances 120, determining which of the host instances 122 have been compromised is critical to being able to mitigate any damage arising from the attack. One way to identify compromised host instances is for a security team to manually and iteratively inspect the host instances 122 for signs of an attack or an attacker. One drawback of this type of iterative inspection process is that, when the number of host instances 122 requiring inspection is relatively large (e.g., 300), identifying compromised host instances 122 can take several hours or even days. During a prolonged inspection process, an attack or attacker is usually able to continue stealing information, hurting business operations, damaging software, etc.

To reduce the time required to detect compromised host instances 122, a file integrity monitoring application can be preemptively deployed to each of the host instances 122. In operation, the typical file integrity monitoring application compares the current state of a given host instance 122 to a previously-captured and known "good" state for that host instance 122 and issues an alert when a mismatch is detected between the two states. One drawback of file integrity monitoring applications is that the evaluation mechanism implemented in such applications is relatively inflexible.

Configurable Workflow for Detecting Anomalous Host Instances

To address the above problems, the compute instance 110 implements a forensic scoping application 150 that automatically analyzes the host instances 122 to identify outliers with respect to security-relevant behavior. As shown, the forensic scoping application 150 resides in the memory 116 of the compute instance 110 and executes on the processor 112 of the compute instance 110. In alternate embodiments, the forensic scoping application 150 may reside in any type of memory and execute on any device that is capable of accessing the memory and executing instructions. Advantageously, the forensic scoping application 150 neither resides nor executes on any of the host instances 122 that the forensic scoping application 150 analyzes.

Note that the techniques described herein are illustrative rather than restrictive, and may be altered without departing from the broader spirit and scope of the embodiments. Many modifications and variations will be apparent to those of ordinary skill in the art without departing from the scope and spirit of the described embodiments and techniques. Further, in various embodiments, any number of the techniques disclosed herein may be implemented while other techniques may be omitted in any technically feasible fashion.

In particular and for explanatory purposes, the functionality of the forensic scoping application 150 is described herein in the context of the host instances 122 that are included in the cloud 102. However, the techniques described herein are applicable to identifying outlying security-relevant behavior for any number and type of host instances 122 included in any number and type of host environments (e.g., on-site data centers, distributed computing environments, distributed data centers, etc.).

In general, the cloud 102 encapsulates any amount and type of shared resources, software, data, etc., across any number of geographical locations in any technically feasible fashion. As shown, the cloud 102 includes, without limitation, any number of storage instances 130 and any number of instance groups 120. Each of the storage instances 130 includes, without limitation, any amount of encapsulated memory that may be accessible to any number of the host instances 122 and any number of external compute instances 110.

Each of the instance groups 120 includes, without limitation, any number and type of the host instances 122 for which one or more security-relevant behaviors and/or configurations are expected to be similar (e.g., listening on the same port(s), running similar processes, etc.). For instance, in some embodiments, each of the instance groups 120 is a collection of host instances 122 that are configured in a similar manner to execute similar software applications (e.g., encoding applications). In the same or other embodiments, each of the instance groups 120 may be an autoscaling group that is subjected to autoscaling and management as a consolidated entity. The instance groups 120 may be generated in any technically feasible fashion.

As shown, the forensic scoping application 150 interacts with the host instances 122 using the host management infrastructure 134 and the query/monitor infrastructure 172. The host management infrastructure 134 includes, without limitation, any number of software applications that enable the forensic scoping application 150 to configure, deploy, and manage the host instances 122 and the instance groups 120. In a complementary fashion, the query/monitor infrastructure 172 includes, without limitation, any number of software applications that enable the forensic scoping application 150 to query and monitor the system activities of the host instances 122.

For instance, in some embodiments, the query/monitor infrastructure 172 may include an open source Web application that manages a fleet of host instances 122 executing osquery. Osquery is agent software that exposes an operating system as a high-performance relational database. Once osquery is deployed on a particular host instance 122(x), the host instance 122(x) can be configured, managed, queried, monitored, etc., via queries written in the Structured Query Language ("SQL"). Osquery may be deployed to many types of host instances 122, such as physical compute instances, containers, and virtual machines. The query/monitor infrastructure 172 may use any type of transport method to communicate with the host instances 122. For instance, in some embodiments, the query/monitor infrastructure 172 uses Simple System Manager ("SSM") to communicate with the host instances 122.

In various embodiments, any amount of the functionality of the host management infrastructure 134 and the query/monitor infrastructure 172 may overlap. In alternate embodiments, the host management infrastructure 134 and/or the query/monitor infrastructure 172 may be replaced or supplemented with any number (including one) of other software applications and/or other infrastructures. The connection topology of the system 100 may be modified accordingly.

For explanatory purposes only, the host management infrastructure 134 and the query/monitor infrastructure 172 are depicted independently of the forensic scoping application 150 and the host instances 122. However, as persons skilled in the art will recognize, at any given time, any portion (including all) of the functionality of the host management infrastructure 134 and/or the query/monitor infrastructure 172 may be implemented within the forensic scoping application 150 and/or any number of the host instances 122.

As shown, the forensic scoping application 150 includes, without limitation, a workflow engine 152, a collection engine 170, a baseline analysis engine 160, and a cluster analysis engine 180. The workflow engine 152 provides a configurable workflow at the granularity of the instance group 120. More precisely, during each execution of the workflow engine 152, the workflow engine 152 performs any number of operations that target one of the host groups 120. Analyzing each of the instance groups 120(1)-120(M) requires M individually configurable executions of the workflow engine 152, where the M executions may occur in series, in parallel, or in any combination thereof.

The workflow engine 152 includes, without limitation, a mode 132, a target group identifier ("ID") 158, and a target instance ID list 156. The mode 132 specifies a current execution mode associated with the forensic scoping engine 150. In some embodiments, the mode 132 specifies one of a baseline generation mode associated with the baseline analysis engine 160, a baseline analysis mode associated with the baseline analysis engine 170, and a cluster analysis mode in which the cluster analysis engine 180 operates.

The current execution of the forensic scoping application 150 is associated with the instance group 120 specified via the target group ID 158 and the host instance(s) 122 specified via the target instance ID list 156. For explanatory purposes only, the instance group 120 that is specified via the target group identifier 158 is also referred to herein as the "target" instance group 120. When the mode 132 specifies the baseline generation mode, the target instance ID list 156 includes, without limitation, a single entry that specifies a newly-deployed host instance 122(y) included in the target instance group 120. Otherwise, the target instance ID list 156 specifies all of the host instances 122 that are included in the target instance group 120.

The workflow engine 152 determines the mode 132, the target group identifier 158, and the target instance identifier list 156 based on one or more forensic requests 154 and, optionally, the results obtained while responding to the forensic requests 154. Each forensic request 154 may request that the workflow engine 152 execute anomaly detection operations and/or may specify any amount and type of configuration information that is applicable to one or more of the instance groups 120.

The workflow engine 152 may implement any number and type of interfaces to acquire the forensic requests 154 from and subsequently provide any associated results to any number and type of clients in any technically feasible fashion. For instance, in some embodiments, the workflow engine 152 may implement any number of graphical user interfaces ("GUIs") and/or any number of command line interfaces ("CLIs") to interface with users (e.g., members of the security response team). In the same or other embodiments, the workflow engine 152 may implement any number and type of application programming interfaces ("APIs") to interface with other software applications, such as an attack detection engine (not shown in FIG. 1). In various embodiments, the workflow engine 152 may provide a web-based interface via a Representational State Transfer ("REST") API.

In some embodiments, the workflow engine 150 configures the query/monitor application 172 directly or indirectly via one or more of the forensic requests 152. In particular, the workflow engine 150 enables customization of a query set 194 at the granularity of the instance group 120. The query set 194 may specify any number and type of queries and/or commands that are consistent with the capabilities of the query/monitor application 172. In general, the query set 194 is designed to, when executed by the host instance 122(x), provide security-relevant observations regarding the host instance 122(x). The security-relevant observations for each host instance 122 are encapsulated into a different snapshot 198.

For example, the query set 194 could include commands that log which ports the host instance 122 is listening on, the processes that the host instance 122 is executing, the command run on ("cron") table entries, kernel module insertions, kernel modules, etc. When executed by the host instance 122(x), the snapshot 198(x) would include a list of processes, a list of cron table entries, a list of kernel module insertions, and a list of kernel modules.

In some embodiments, the query/monitor application 172 is a remote management tool, such as Secure Shell ("SSH"), that is capable of executing chains of commands. Accordingly, the query set 194 can be tailored to provide relatively observations for relatively complex scenarios. For example, the query set 194 could include a chain of commands that disable Internet Protocol Version Layer 6 ("IPv6"), determine whether or not any processes change, and then re-enable IPv6. When the query set 194 is executed on the host instances 122, the resulting observations may provide insight into whether one or more of the host instances 122 have been compromised during a cryptomining attack.

In operation, the collection engine 170 configures the query/monitor infrastructure 172 to execute the query request 194 on the host instances 122 specified in the target host ID list 156 on behalf of the baseline analysis engine 160 and the cluster analysis engine 180. As shown, the collection engine 170 generates a collection request 190 that includes, without limitation, the target host ID list 156 and the query set 194. Note that the collection engine 170 generates the collection request 190 in a format that is compatible with the query/monitor infrastructure 172.

Prior to transmitting the collection request 190 to the query/monitor infrastructure 172, the collection engine 170 may perform any number and type of operations to properly configure the host instances 122 specified in the target host ID list 156. For instance, if the query/monitor infrastructure 172 is based on osquery, then the collection engine 170 may install the osquery agent on each of the host instances 122 specified in the target host ID list 156 for which the osquery agent is not already installed. In various embodiments, the query/monitor infrastructure 172 comprises a software agent (e.g., an osquery agent) and, after installing the software agent on each of the host instances 122, the collection engine 170 transmits the collection request 190 directly to the installed software agents.

The query/monitor infrastructure 172 relays the query set 194 to each of the host instances 122 specified in the target host ID list 156 via any compatible transfer mechanism (e.g., SSH). In response to receiving the query set 194, each of the host instances 122 execute the query set 194 to generate a different snapshot 198 that encapsulates the observations generated during the execution on the query set 194. The content and format of each of the snapshots 198 depend on the query set 194 and the query/monitor infrastructure 172. For instance, in some embodiments, each of the snapshots 198 may include any number of JavaScript Object Notation "JSON" files. In the same or other embodiments, each of the snapshots 198 may include a tabular output representing the current operational state.

For explanatory purposes only, the operation of the collection engine 170, the format of the collection request 190, and the operation of the query/monitor infrastructure 172 are described for an exemplary query/monitor infrastructure 172 that is capable of managing multiple host instances 122 in parallel. In alternate embodiments, the collection engine 170 may generate a separate collection request 190 for each of the host instances 122 specified in the target host ID list 156 and relay each of the collection requests 190 to the query/monitor infrastructure 172. The query/monitor infrastructure 172 may execute the collection requests 190 on the different host instances 122 sequentially, concurrently, or in any combination thereof.

In operation, the workflow engine 150 configures the baseline analysis engine 160 and/or the cluster analysis engine 180 to execute in response to each of the following types of forensic requests 152: a baseline generation request, a baseline analysis request, a clustering analysis request, and a generic analysis request. As part of configuring the baseline analysis engine 160 and the cluster analysis engine 180, the workflow engine 152 interfaces with the host management infrastructure 134 to determine associations between the host instances 122 and the instance groups 120. In alternate embodiments, the workflow engine 152 may determine associations between the host instances 122 and the instance groups 120 in any technically feasible fashion.

A baseline generation request specifies the host instance 122(y) and, optionally, the query set 194. Upon receiving the baseline generation request, the workflow engine 152 sets the mode 132 to specify the baseline generation mode, the target instance identifier list 156 to specify the host instance 122(y), and the target group identifier 158 to specify the instance group 120(x) to which the host instance 122(y) belongs. The workflow engine 152 then configures the baseline analysis engine 160 to execute in the baseline generation mode based on the target group identifier 158, the target instance identifier list 156, and the query set 194.

In the baseline generation mode, the baseline analysis engine 160 generates a baseline dataset 142 that is associated with the target instance group 120. To generate the baseline dataset 142, the baseline analysis engine 160 configures the collection engine 170 to generate the snapshot 198 for a newly-deployed host instance 122 that is specified via the target instance identifier list 156 using the query set 194. The baseline analysis engine 160 may acquire the query set 194 in any technically feasible fashion. For instance, in some embodiments, the query set 194 is specified via the baseline generation request. In various embodiments, the baseline analysis engine 160 or the workflow engine 152 implement a default query set 194.

Subsequently, the baseline analysis engine 160 generates a baseline dataset 142 that specifies the snapshot 198, the specified query set 194, and the target instance group 120. The baseline analysis engine 160 then stores the baseline dataset 142 in a baseline database 140 that resides in one of the storage instances 130(1) included in the cloud 102. Note that, to maintain the integrity of the baseline database 140, the storage instance 130(1) is not accessible to the host instances 122. In alternate embodiments, the baseline database 140 may reside in any memory that is accessible to the baseline analysis engine 160.

A baseline analysis request specifies the instance group 120(x). Upon receiving a baseline analysis request, the workflow engine 152 sets the mode 132 to specify the baseline analysis mode, the target group identifier 158 to specify the instance group 120(x), and the target instance identifier list 156 to specify all of the host instances 122 that are included in the target instance group 120(x). The workflow engine 152 then configures the baseline analysis engine 160 to execute in the baseline analysis mode based on the target group identifier 158 and the target instance identifier list 156.

In the baseline analysis mode for the target instance group 120, the baseline analysis engine 160 detects anomalies in the host instances 122 included in the target instance group 120 using the "baseline" query set 142 associated with the target instance group 120 and stored in the baseline database 140. More precisely, for each of the host instances 122(y) included in the target instance group 120, the baseline analysis engine 160 configures the collection engine 170 to generate the snapshot 198(y) using the baseline query set 142. The baseline analysis engine 160 then compares each of the newly acquired snapshots 198 to the "baseline" snapshot 198 to determine anomalies in the behavior of the host instances 122. The "baseline" snapshot 198 is associated with the target instance group 120 and is stored in the baseline database 140

Typically, prior to a security attack, for each of the instances groups 120, the baseline analysis engine 160 is preemptively executed in the baseline generation mode to generate the associated baseline dataset 142. Subsequently, during a security attack, the baseline analysis engine 160 is executed in the baseline analysis mode to detect anomalies in the host instances 122 included in each of the instance groups 120. An example of the baseline generation mode is described below and an example of the baseline analysis mode is described in conjunction with FIG. 2.

Based on the results generated by the baseline analysis engine 160 in response to a baseline analysis request, the workflow engine 152 may subsequently execute any number of follow-up operations. For instance, in some embodiments, if the baseline analysis engine 160 is unable to retrieve the baseline dataset 142(x) associated with the target instance group 120(x), then the workflow engine 152 changes the mode 132 to specify the cluster analysis mode. The workflow engine 152 then configures the cluster analysis engine 180 to execute based on the target group identifier 158 and the target instance identifier list 156.

In other embodiments, if the baseline analysis engine 152 is unable to retrieve a baseline snapshot 198 for the instance group 120(x), then the workflow engine 152 interacts with a user and the host management infrastructure 132 to deploy a new host instance 122(z) that is included in the instance group 120(x). The host instance 122(z) may be configured to be a representative example of a properly executing host instance 122 included in the instance group 120(x) based on any amount of configuration data. An example of such configuration data is a container image associated with the instance group 120(x). Subsequently, the workflow engine 152 configures the baseline analysis engine 152 to generate the baseline snapshot 198 for the instance group 120(x) based on the new host instance 122(z). The workflow engine 152 then configures the baseline analysis engine 152 to re-execute the baseline analysis request.

In the same or other embodiments, if the baseline analysis engine 160 does not identify any anomalies, then the workflow engine 152 changes the mode 132 to specify the cluster analysis mode. The workflow engine 152 then configures the cluster analysis engine 180 to execute based on the target group identifier 158 and the target instance identifier list 156.

A cluster analysis request specifies the instance group 120(x) and, optionally, the query set 194(x). Upon receiving the cluster analysis request, the workflow engine 152 sets the mode 132 to specify the baseline generation mode, the target group identifier 158 to specify the instance group 120(x), and the target instance identifier list 156 to specify all of the host instances 122(y) included in the instance group 120(x). The workflow engine 152 then configures the cluster analysis engine 180 to identify anomalies associated with the host instances 122 included in the target instance group 120 based on the target group identifier 158, the target instance identifier list 156, and the query set 194(x).

The cluster analysis engine 180 performs one or more clustering operations to detect anomalies associated with the host instances 122 included in the target instance group 120. Advantageously, the cluster analysis engine 180 does not rely on any previously generated observations. For this reason, during a security attack, the cluster analysis engine 180 is typically configured to detect anomalies for the instance groups 120 that lack an associated baseline dataset 142.

In operation, for each of the host instances 122(y) included in the target instance group 120(x), the cluster analysis engine 180 configures the collection engine 170 to acquire the snapshot 198(y) based on the query set 194(x). The cluster analysis engine 180 may generate and/or acquire the query set 194(x) in any technically feasible fashion. For instance, in some embodiments, the query set 194(x) is specified via the cluster analysis request. In various embodiments, the cluster analysis engine 180 includes, without limitation, a targeting engine (not shown in FIG. 1) that customizes the query set 194(x) to obtain observations that are particularly relevant for the target instance group 120 and/or a current security attack.

The cluster analysis engine 180 then performs any number and type of clustering operations based on the newly acquired snapshots 198 to generate one or more clusters. The cluster analysis engine 180 identifies any number of anomalies in the behavior of the host instances 122 based on the clusters. The cluster analysis engine 180 may identify the anomalies in any technically feasible fashion. The cluster analysis engine 180 is described in greater detail in conjunction with FIG. 3.

A generic analysis request specifies the instance group 120(x) and, optionally, the query set 194(x). Upon receiving the generic analysis request, the workflow engine 152 determines whether to configure the baseline analysis engine 160 and/or the cluster analysis engine 180 to identify anomalies associated with the instance group 120(x) in any technically feasible fashion. For example, if the baseline dataset 140(x) does not exist or the number of host instances 122 included in the instance group 120(x) exceeds a specified threshold, then the workflow engine 152 could configure the cluster analysis engine 180 to analyze the instance group 120(x). Otherwise, the workflow engine 152 could configure the baseline analysis engine 160 analyze the instance group 120(x).

As the various workflows described above illustrate, the ability of the forensic scoping application 150 to perform baseline-based anomaly detection operations, cluster-based anomaly detection operations, and to execute a wide variety of different query sets 194 provides a flexible framework that facilitates efficient and effective identification of compromised host instances 122.

In various embodiments, the forensic scoping application 150 implements a plug-in architecture, the collection engine 180 may be implemented as a collection plug-in, and the baseline analysis engine 160 and the cluster analysis engine 160 may be implemented as analysis plug-ins. In alternate embodiments, the forensic scoping application 150 may include any number and type of collection plug-ins and any number and type of analysis plug-ins in any combination.

For explanatory purposes only, a series of actions that the forensic scoping application 150 executes in response to an exemplary baseline generation request is depicted as a series of numbered bubbles. Exemplary values are depicted in italics. As depicted with the bubble numbered 1, the workflow engine 152 receives the baseline generation request specifying the host instance 122(1) A1. In response, the workflow engine 152 sets the mode 132 to baseline generation, the target instance identifier list 156 to specify the host instance 122(1) A1 and the target group identifier 158 to specify the instance group 120(1) to which the host instance 122(1) A1 belongs.

As depicted with the bubble numbered 2, the workflow engine 152 configures the baseline analysis engine 160 to execute in the baseline generation mode for the host instance 122(1) A1 and the target instance group 120. The baseline analysis engine 160 sets the query set 194 equal to a default baseline query set, and then configures the collection engine 170 to execute based on the target instance identifier list 156 and the query set 194 (bubble numbered 3).

As depicted with the bubble numbered 4, the collection engine 170 generates the collection request 190 and transmits the collection request 190 to the query/monitor infrastructure 172. The query/monitor infrastructure 172 transmits the query set 194 to the host instance 122(1) A1 (depicted with the bubble numbered 5). In response, and as depicted with bubble numbered 6, the host instance 122(1) A1 generates the snapshot 198(1) and transmits the snapshot 198(1) to the collection engine 170. As depicted with the bubble numbered 7, the collection engine 170 transmits the snapshot 190(1) to the baseline analysis engine 160. As depicted with the bubbled numbered 8, the baseline analysis engine 160 generates and stores the baseline dataset 142(1) that specifies the query set 194, the snapshot 198(1), and the target group ID 156.

Automatically Detecting Anomalies During
Security Attacks

Figure 2:
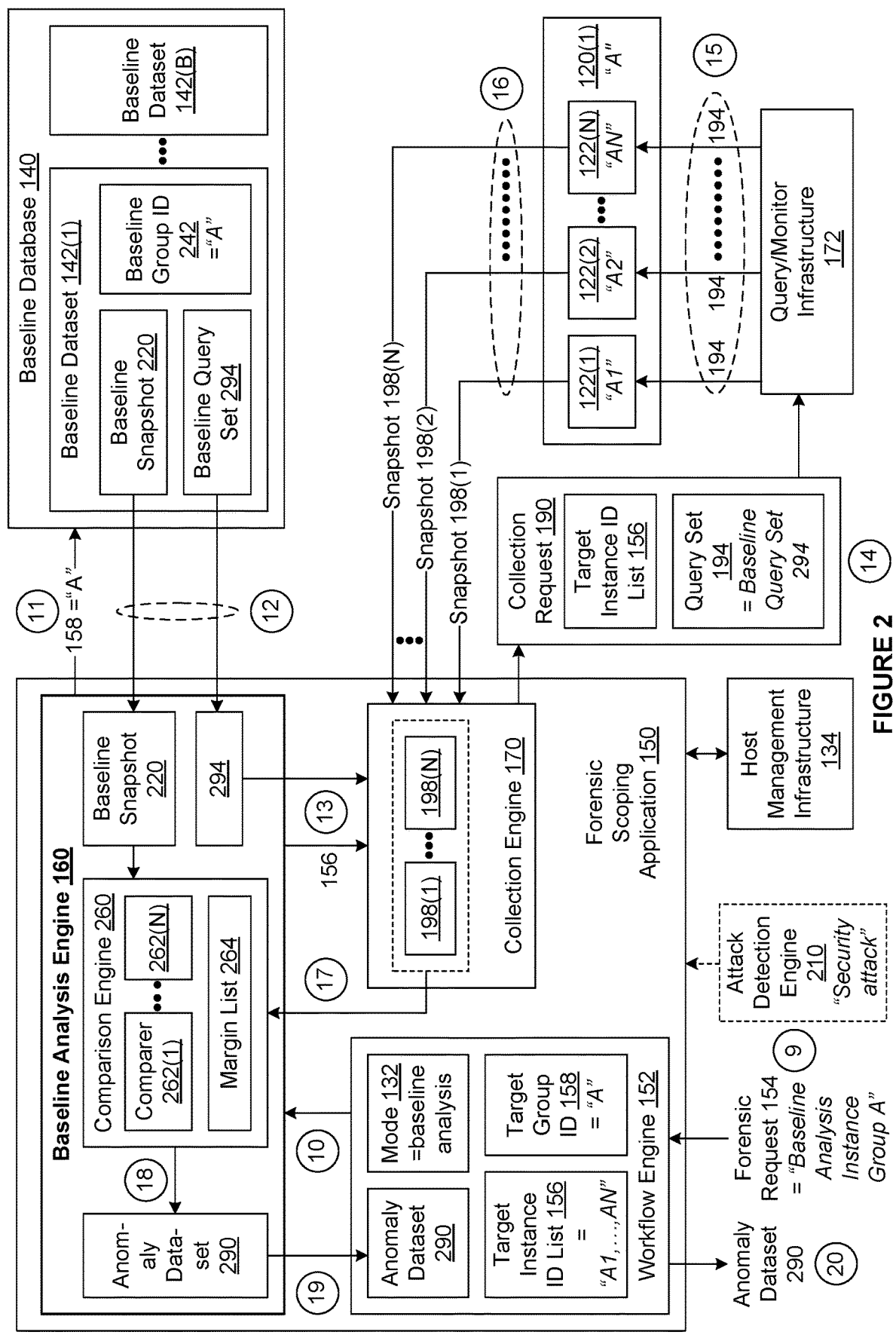
FIG. 2 is a more detailed illustration of the baseline analysis engine of FIG. 1, according to various embodiments.

FIG. 2 is a more detailed illustration of the baseline analysis engine 160 of FIG. 1, according to various embodiments. For explanatory purposes only, the baseline analysis engine 160 is described in the context of executing an exemplary baseline analysis request following the exemplary baseline generation request depicted in FIG. 1, Because a series of actions associated with the exemplary baseline generation request is depicted in FIG. 1 as a series of numbered bubbles 1-8, a series of actions that the forensic scoping application 150 executes in response to the baseline analysis request is depicted as a series of numbered bubbles 9-16 in FIG. 2. Exemplary values are depicted in italics.

As depicted with the bubble numbered 9, an attack detection engine 210 detects a security attack and, as a result, the workflow engine 150 receives the forensic request 154 to perform a baseline analysis for the instance group 120(1) A. In response, the workflow engine 152 sets the mode 132 to baseline analysis, the target group identifier 158 to specify the instance group 120(1) A, and the target instance identifier list 156 to specify the host instances 122(1)-122(N) A1-AN that are included in the instance group 120(1) A. As depicted with the bubble numbered 10, the workflow engine 152 configures the baseline analysis engine 160 to execute in the baseline analysis mode for the instance group 120(1) A The baseline analysis engine 160 searches the baseline database 140 (depicted via the bubble numbered 11) to identify the baseline dataset 142(1) associated with the instance group 120(1) A. As shown, the baseline dataset 142(1) includes, without limitation, a baseline group ID 252, a baseline snapshot 220, and a baseline query set 294. The baseline group ID 252 specifies the ID of the instance group 120(1) A that is associated with the baseline dataset 142(1). The baseline snapshot 220 specifies the snapshot 198 that the baseline analysis engine 160 previously acquired for a newly deployed host instance 122 included in the instance group 120(1) A. The host instance 122 that the baseline snapshot 220 is acquired from is also referred to herein as a "baseline" host instance 122. The baseline snapshot 220 represents a nominal operating state for the baseline host instance 122.

The baseline query set 294 specifies the query set 194 that the baseline analysis engine 160 used to generate the baseline snapshot 220(1). Note that if the baseline analysis engine 160 had not previously generated the baseline dataset 142(1) for the instance group 120(1) A, then the baseline analysis engine 160 would indicate an error condition to the baseline analysis engine 160 and would abort the baseline analysis process for the instance group 120(1) A.

As shown, the baseline analysis engine 160 includes, without limitation, the baseline snapshot 220, the baseline query set 294, a comparison engine 260, and an anomaly dataset 290. As depicted with the bubble numbered 12, the baseline analysis engine 160 copies the baseline snapshot 220 and the baseline query set 294 from the baseline dataset 142(1) associated with the instance group 120(1) to the baseline analysis engine 160.

As depicted via the bubble numbered 13, the baseline analysis engine 160 configures the collection engine 170 to execute based on the target instance identifier list 156 and the baseline query set 294. The collection engine 170 generates the collection request 190 that specifies the target instance identifier list 156 and the baseline query set 294 (bubble numbered 14) and transmits the collection request 190 to the query/monitor infrastructure 172.

The query/monitor infrastructure transmits the baseline query set 294 to each of the host instances 122(1)-122(N) included in the instance group 120(1) A, depicted as bubble numbered 15. The host instances 221(1)-222(N) included in the instance group 120(1) A generate, respectively, the snapshots 198(1)-198(N). As depicted with the bubble numbered 16, the host instances 122(1)-122(N) included in the instance group 120(1) A then transmit, respectively, the snapshots 198(1)-198(N) to the collection engine 170. The collection engine 170 transmits the snapshots 198(1)-198(N) to the comparison engine 260 (depicted via bubble numbered 17).

The comparison engine 260 includes, without limitation, any number of comparers 262, and a threshold list 264. For explanatory purposes only, the number of comparers 262 is equal to the number of host instances 122 included in the instance group 120(1) A. In alternate embodiments, the number of comparers 262 may differ from the number of host instances 122 included in the target instance group 120(1) A. As a general matter, any number of the comparers 262 may operate sequentially, concurrently, or in any combination thereof.

The margin list 264 specifies any number of margins that are associated with the snapshots 198. Each margin may be associated with any number and type of the observations included in the snapshots 198 in any technically feasible fashion. For instance, in some embodiments, a different margin is specified for different types of observations. Each of the comparers 262(i) performs comparison operations between the snapshot 198(i) and the baseline snapshot 220 to determine any snapshot differences (not shown) that exceed the associated margins specified in the margin list 264.

In alternate embodiments, the comparison engine 260 may determine snapshot differences between each of the snapshots 198(1)-198(N) and the baseline snapshot 220 in any technically feasible fashion. Based on the snapshot differences computed by the comparers 262 (and as depicted with bubble numbered 18), the comparison engine 260 generates the anomaly dataset 290.

The comparison engine 260 may generate the anomaly dataset 290 is any technically feasible fashion based on the snapshot differences. In various embodiments, the comparison engine 260 filters and/or ranks the snapshot differences in an order of relative importance based on any number of configuration settings (not shown). For example, the comparison engine 260 could filter-out snapshot differences that are not related to security-relevant observations. Subsequently, the comparison engine 260 could rank the remaining snapshot differences based on the magnitude or type of observation.

As depicted with the bubble numbered 19, the baseline analysis engine 160 transmits the anomaly dataset 190 to the workflow engine 152. Finally (bubble numbered 20), the workflow engine 152 transmits the anomaly dataset 190 to any number of software applications for use in mitigating the security threat detected by the attack detection engine 210.

Figure 3:
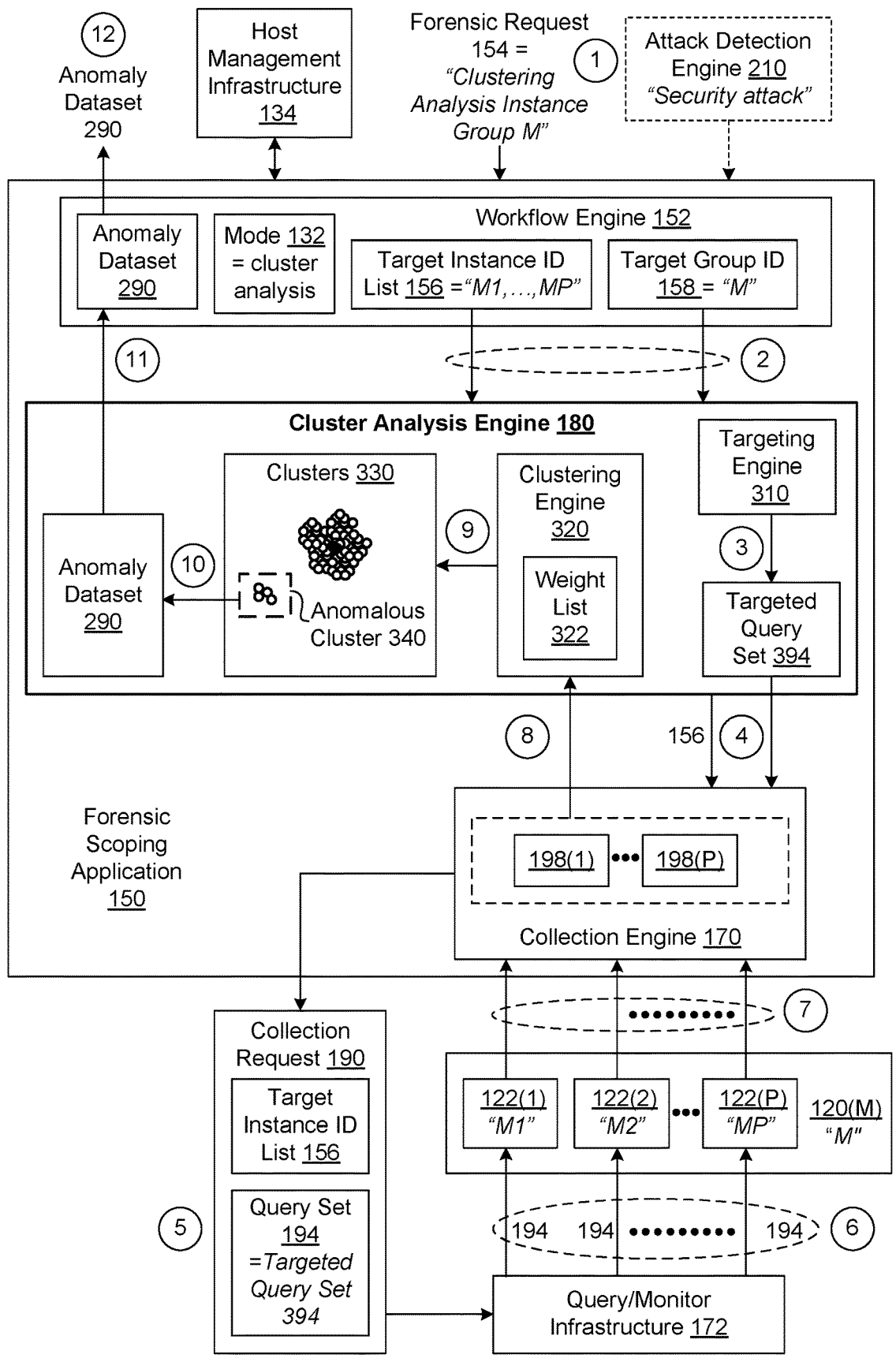
FIG. 3 is a more detailed illustration of the cluster analysis engine of FIG. 1, according to various embodiments.

FIG. 3 is a more detailed illustration of the cluster analysis engine 180 of FIG. 1, according to various embodiments. For explanatory purposes only, the cluster analysis engine 180 is described in the context of executing an exemplary cluster analysis request. Further, a series of actions that the forensic scoping application 150 executes in response to the cluster analysis request is depicted as a series of numbered bubbles 1-12. Exemplary values are depicted in italics.

As depicted with the bubble numbered 1, the attack detection engine 210 detects a security attack and, as a result, the workflow engine 150 receives the forensic request 154 to perform a cluster analysis for the instance group 120(M) M. In response, the workflow engine 152 sets the mode 132 to cluster analysis, the target group identifier 158 to specify the instance group 120(M) M, and the target instance identifier list 156 to specify the host instances 122(1)-122(M) M1-MP that are included in the instance group 120(M) M. As depicted via the bubble numbered 2, the workflow engine 152 configures the cluster analysis engine 180 to detect anomalies associated with the host instances 122(1)-122(M) M1-MP included in the instance group 120(M).

The cluster analysis engine 180 includes, without limitation, a targeting engine 310, a targeted query set 394, a clustering engine 320, any number of clusters 330, and the anomaly dataset 290. As depicted with the bubble numbered 3, the targeting engine 310 generates the targeted query set 394 based on the instance group 120(M) M. The targeted query set 392 is a customized version of the query set 194 described previously herein.

The targeting engine 310 may generate the targeted query set 394 in any technically feasible fashion and based on any amount and type of security-relevant data. For instance, in some embodiments, the targeting engine 310 may include different queries in the targeted query set 394 based on the type of software applications that typically execute within the instance group 120(M) M. In the same or other embodiments, the targeting engine 310 may include different queries in the targeted query set 394 based on the type of the current security attack.

As depicted with the bubble numbered 4, the cluster analysis engine 180 configures the collection engine 170 to execute based on the target instance identifier list 156 and the targeted query set 394. The collection engine 170 generates the collection request 190 that specifies the target instance identifier list 156 and the targeted query set 394 (bubble numbered 5) and transmits the collection request 190 to the query/monitor infrastructure 172.

The query/monitor infrastructure 172 transmits the targeted query set 394 to each of the host instances 122(1)-122(P) included in the instance group 120(M) M (depicted via the bubble numbered 6). The host instances 122(1)-122(P) included in the instance group 120(M) generate, respectively, the snapshots 198(1)-198(M). As depicted with the bubble numbered 7, the host instances 221(1)-222(P) included in the instance group 120(M) then transmit, respectively, the snapshots 198(1)-198(P) to the collection engine 170. The collection engine 170 then relays the snapshots 198(1)-198(N) to the clustering engine 320 (depicted as the bubble numbered 8).

The clustering engine 320 includes, without limitation, a weight list 322. The weight list 322 species any number of weights, where each weight indicates a level of security-relevance for any number of security-relevant features derived from observations included in the snapshots 198. Examples of features include, without limitation, the number of processes, the number of unique processes, the number of processes having an unexpected name, the number of kernel module insertions, etc. For example, the weight associated with the number of kernel modules insertions would typically be higher than the weight associated with the number of unique processes. The clustering engine 320 may extract any number of features from the observations included in the snapshots 198 in any technically feasible fashion.

The clustering engine 320 then executes any number and type of clustering algorithms k-means clustering, k-nearest neighbors, etc.) based on different features and/or subsets of features across the different snapshots 198 to generate the clusters 330. The clustering engine 320 then evaluates the clusters 330 to determine which of the features are least common. For instance, based on the two clusters 330 illustrated in FIG. 3, the clustering engine 320 determines that the feature associated with the smaller cluster is relatively uncommon. The clustering engine 320 then identifies the smaller cluster as an anomalous cluster 340. In various embodiments, the clustering engine 320 may identify the cluster 330 that is associated with the largest number of host instances 122 as a primary cluster (not shown) and all other clusters 330 as anomalous clusters 340.

Subsequently, the clustering engine 320 weights the least common features based on the weight list 322 to determine an overall priority ranking for the features. The priory ranking for a feature estimates a relative likelihood that the observed differences associated with the feature are signs of a security attack. As depicted with the bubble numbered 10, the clustering engine 320 generates the anomaly dataset 290 based on the differences for the features having the highest priority rankings. As part of generating the anomaly dataset 290, the clustering engine 320 may perform any number of additional filtering and/or ranking operations based on the clusters 330. As depicted with the bubble numbered 11 the baseline analysis engine 160 transmits the anomaly dataset 190 to the workflow engine 152. As depicted via bubble numbered 20, the workflow engine transmits the anomaly dataset 190 to any number of software applications for use in mitigating the security threat detected by the attack detection engine 210.

In alternate embodiments, the clustering engine 320 may perform any number and type of clustering operations directly or indirectly on any amount and type of observations included in the snapshots 198 to generate any number and type of clusters 330 in any technically feasible fashion. In the same or other embodiments, the clustering engine 320 may determine any number of anomalous clusters 330 in any technically feasible fashion. In various embodiments, the clustering engine 320 may omit the weight list 322 and may perform any type of filtering, ranking, sorting, etc., operations based on the clusters 330 and/or the snapshots 198 to generate the anomaly dataset 290.

Figure 4A:
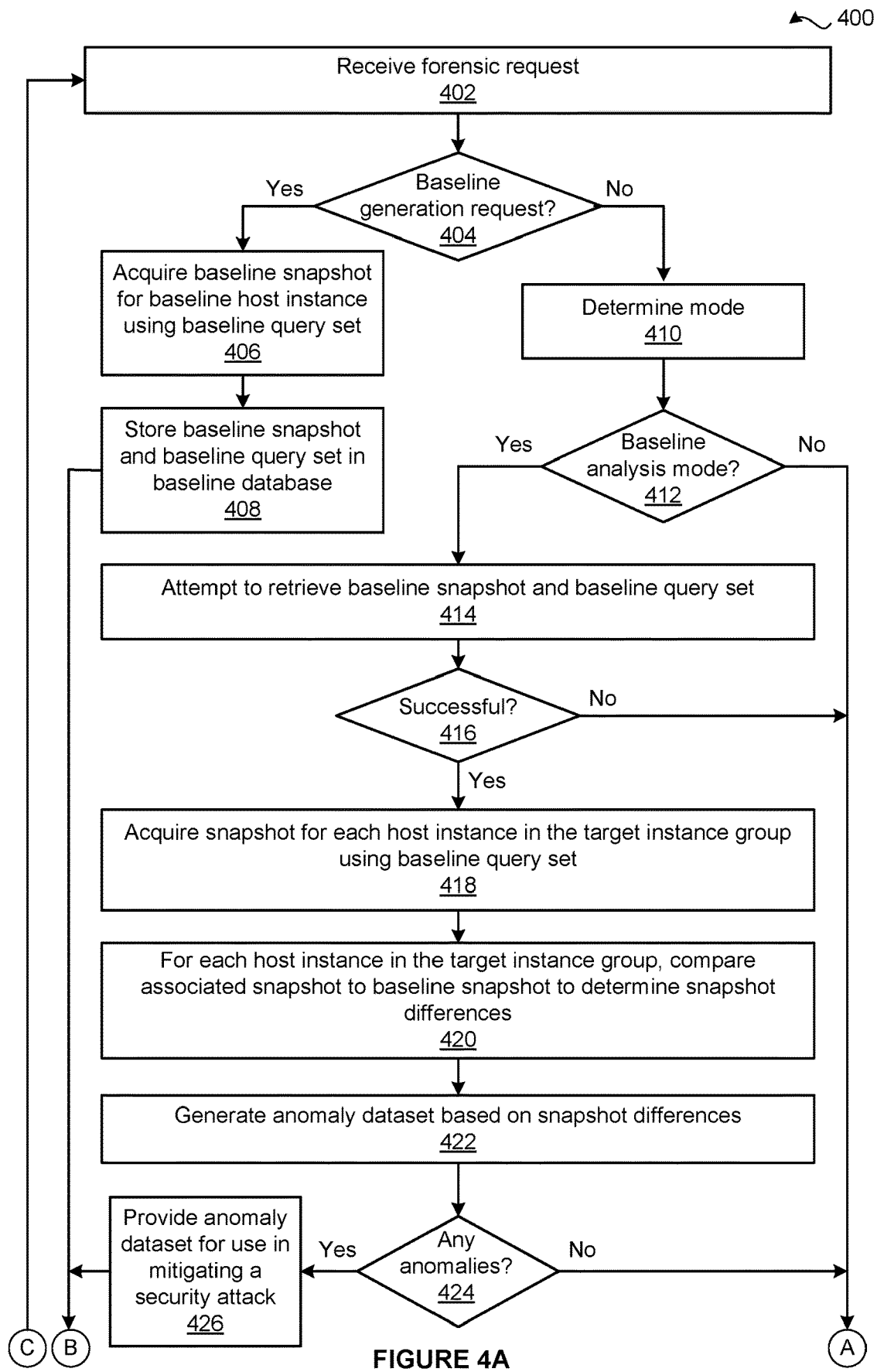
FIGS. 4A-4B set forth a flow diagram of method steps for analyzing host instances in a computing environment in order to mitigate a security attack, according to various embodiments.
Figure 4B:
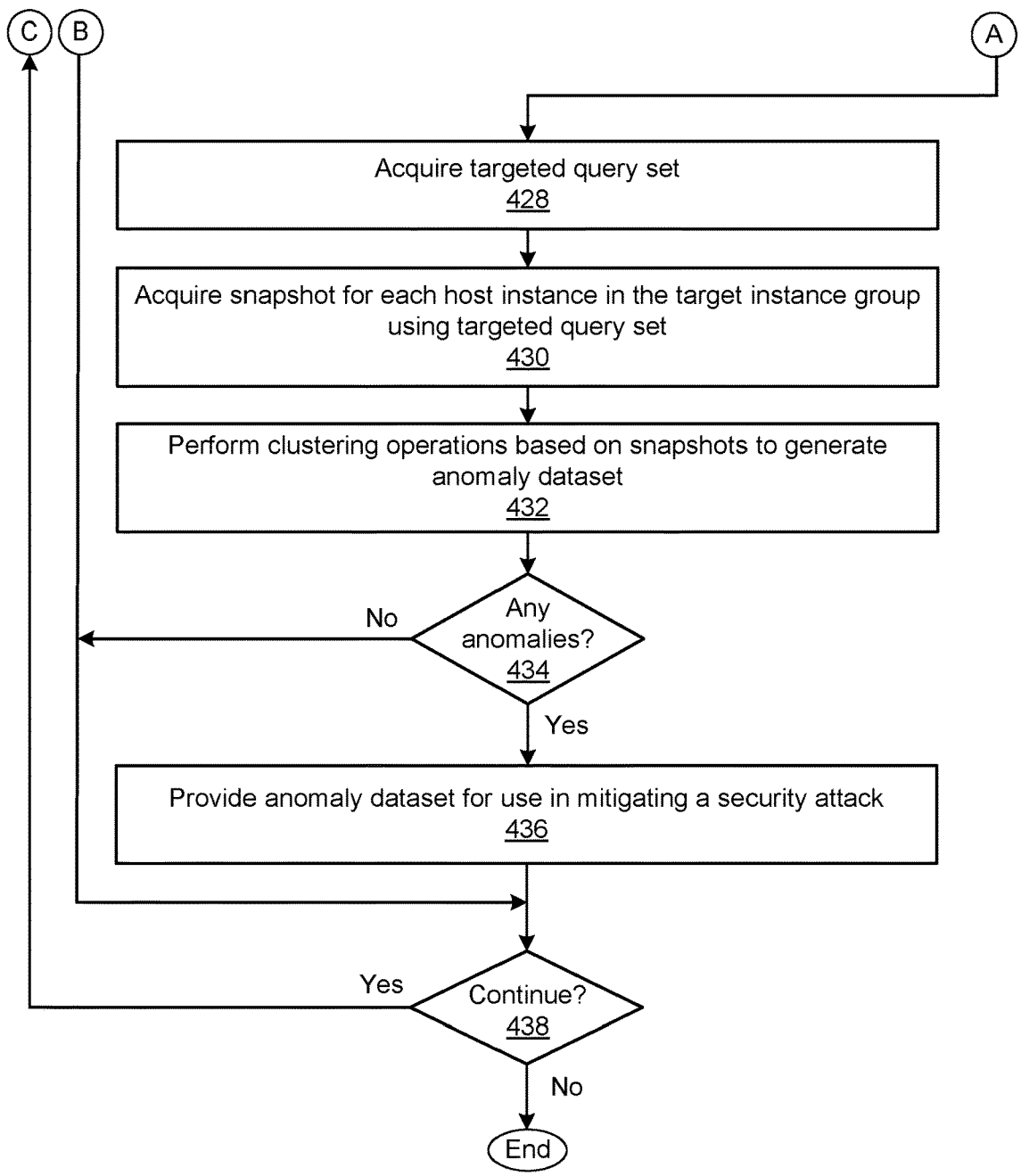

FIGS. 4A-4B set forth a flow diagram of method steps for analyzing host instances in a computing environment in order to mitigate a security attack, according to various embodiments. Although the method steps are described with reference to the systems of FIGS. 1-3, persons skilled in the art will understand that any system configured to implement the method steps, in any order, falls within the scope of the various embodiments.

As shown, a method 400 begins at step 402, where the workflow engine 152 receives the forensic request 154. At step 404, the workflow engine 152 determines whether the forensic request 154 is a baseline generation request. If, at step 404, the workflow engine 152 determines that the forensic request 154 is a baseline generation request, then the method 400 proceeds to step 406.

At step 406, the baseline analysis engine 160 acquires the baseline snapshot 220 for the host instance 122 specified in the forensic request 154 using the baseline query set 294. At step 408, the baseline analysis engine 160 stores the baseline snapshot 220, the baseline query set 294, and the baseline group ID 242 specifying the instance group 120 to which the host instance 122 belongs as a new baseline dataset 142 in the baseline database 140. The method 408 then proceeds directly to step 438.

If, however, at step 404, the workflow engine 152 determines that the forensic request 154 is not a baseline generation request, then the method 400 proceeds directly to step 410. At step 410, the workflow engine 152 determines the mode 132 based on the forensic request 154. At step 412, the workflow engine 152 determines whether the mode 132 is the baseline analysis mode. If, at step 412, the workflow engine 152 determines that the mode 132 is the baseline analysis mode, then the method 400 proceeds to step 414.

At step 414, the baseline analysis engine 160 attempts to retrieve, from the baseline database 140, the baseline snapshot 220 and the baseline query set 294 associated with the target instance group 120 specified in the forensic request 154. At step 416, the baseline analysis engine 160 determines whether the baseline analysis engine 160 has successfully retrieved the baseline snapshot 220 and the baseline query set 294. If, at step 416, the baseline analysis engine 160 determines that the baseline analysis engine 160 has successfully retrieved the baseline snapshot 220 and the baseline query set 294, then the method proceeds to step 418.

At step 418, the baseline analysis engine 160 acquires the snapshot 198 for each of the host instances 122 included in the target instance group 120 using the baseline query set 294. At step 420, for each of the host instances 122 included in the target instance group 120, the comparison engine 260 compares the associated snapshot 198 to the baseline snapshot 220 to determine snapshot differences. At step 422, the baseline analysis engine 160 generates the anomaly dataset 290 based on the snapshot differences.

At step 424, the workflow engine 152 determines whether the anomaly dataset 290 specifies any anomalies. If, at step 424, the workflow engine 152 determines that the anomaly dataset 290 specifies anomalies, then the method 400 proceeds to step 426. At step 426, the workflow engine 152 provides the anomaly dataset 290 to one or more software applications for use in mitigating a security attack. The method 400 then proceeds directly to step 438.

Returning now to step 412, if the workflow engine 152 determines that the mode 132 is not the baseline analysis mode, then the method 400 proceeds directly to step 428.

Returning now to step 416, if the baseline analysis engine 160 determines that the baseline analysis engine 160 has not successfully retrieved the baseline snapshot 220 and the baseline query set 294, then the method 400 proceeds directly to step 428

Returning now to step 424, if the workflow engine 152 determines that the anomaly dataset 290 does not specify any anomalies, then the method 400 proceeds directly to step 428.

At step 428, the targeting engine 310 acquires the targeted query set 394. At step 430, the cluster analysis engine 180 acquires a different snapshot 198 for each of the host instances 122 included in the target instance group 120 using the targeted query set 394. At step 432, the clustering engine 320 performs clustering operations based on the snapshots 198 associated with the target instance group 120 to generate the anomaly dataset 290.

At step 434, the workflow engine 152 determines whether the anomaly dataset 290 specifies any anomalies. If, at step 434, the workflow engine 152 determines that the anomaly dataset 290 specifies anomalies, then the method 400 proceeds to step 436. At step 436, the workflow engine 152 provides the anomaly dataset 290 to one or more software applications for use in mitigating a security attack. If, however, at step 434, the workflow engine 152 determines that the anomaly dataset 290 does not specify any anomalies, then the method 400 proceeds directly to step 438.

At step 438, the workflow engine 152 determines whether to continue operating. If, at step 438, the workflow engine 152 determines to continue operating, then the method 400 returns to step 402, where the workflow engine 152 receives a new forensic request 154. If, however, at step 438, the workflow engine 152 determines to cease operating, then the method 400 terminates.

Note that in some embodiments and during a single security attack, the forensic requests 154(1) and 154(2) may configure, respectively, the baseline analysis engine 160 and the cluster analysis engine 180 to perform analysis operations for a single instance group 120($x$). In the same or other embodiments, the forensic request 154(1) for a baseline analysis may directly configure the baseline analysis engine 160 to perform analysis operations for the instance group 120($x$). If no anomalies are included in the resulting anomaly dataset 290, then (at step 624) the workflow engine 152 may configure the cluster analysis engine 180 to perform analysis operations for the instance group 120($x$) to generate a new anomaly dataset 290.

In sum, the disclosed techniques may be used to efficiently and reliably mitigate security attacks on host instances. A forensic scoping application evaluates instance groups of host instances having similar behavior based on forensic commands that configure the behavior of a baseline analysis engine and a cluster analysis engine. Prior to a security attack, the baseline analysis engine can be configured to operate in a baseline generation mode. In the baseline generation mode, the baseline analysis engine generates a baseline snapshot of security-relevant observations for a newly-deployed host instance included in a target instance group.

During a security attack, the baseline analysis engine can be configured to operate in a baseline analysis mode. In the baseline analysis mode, the baseline analysis engine generates snapshots for each of the host instances included in a target instance group for which a baseline snapshot exists. The baseline analysis engine compares each of the snapshots to the baseline snapshot to detect any security-relevant anomalies. The baseline analysis engine then generates an anomaly dataset specifying significant anomalies. During the same security attack, the cluster analysis engine can be configured to evaluate the same or other instance groups. In operation, the cluster analysis engine generates snapshots for each of the host instances included in a target instance group. The cluster analysis engine then performs clustering operations based on the snapshots to detect any outliers with respect to security-relevant features. The cluster analysis engine then generates an anomaly dataset that specifies significant outliers. The anomaly datasets generated by the baseline analysis engine and the cluster analysis engine can subsequently be used to identify and remediate compromised host instances.

At least one technical advantage of the disclosed techniques relative to the prior art is that the forensic scoping application can be used to efficiently and effectively identify host instances exhibiting anomalous behavior during security attacks. In that regard, because the forensic scoping application automatically collects and evaluates the snapshots, the time required to identify compromised host instances during a security attack can be reduced relative to prior art approaches. Reducing the time required to identify host instances that are compromised during a security attack typically can reduce the amount of damage caused by the attack. In addition, unlike prior art approaches that require preemptive deployment of software applications to each host instance, the forensic scoping application can externally evaluate host instances without any previously generated data. Consequently, unlike some prior art approaches, the queries used to generate the snapshots can be flexibly modified during a security attack to increase the effectiveness of detecting compromised host instances. These technical advantages represent one or more technological advancements over prior art approaches.

1. In some embodiments, a method comprises acquiring a first plurality of snapshots for a first instance group, wherein each snapshot represents a current operational state of a different host instance included in the first instance group; performing one or more clustering operations based on the first plurality of snapshots to generate a first plurality of clusters; and determining that a first host instance included in the first instance group is operating in an anomalous fashion based on a first cluster included in the first plurality of clusters that is associated with fewer host instances than at least a second cluster included in the first plurality of clusters.

2. The method of clause 1, where each host instance comprises a self-contained execution environment.

3. The method of clauses 1 or 2, wherein wherein the first instance group is associated with a cloud-based computing environment, an on-site data center, a distributed computing environment, or a distributed data center.

4. The method of any of clauses 1-3, wherein the first instance group is configured as a consolidated entity for performing autoscaling and management operations.

5. The method of any of clauses 1-4, wherein acquiring the first plurality of snapshots comprises, for each host instance included in the first instance group, transmitting a set of queries to the host instance and, in response, receiving a snapshot of a current state of the host instance.

6. The method of any of clauses 1-5, wherein each snapshot included in the first plurality of snapshots includes at least one of a list of processes, a list of command run on table entries, a list of kernel module insertions, and a list of kernel modules.

7. The method of any of clauses 1-6, wherein the first plurality of snapshots is associated with a first set of queries, and further comprising, prior to acquiring the first plurality of snapshots, acquiring a second plurality of snapshots for the first instance group using a baseline set of queries; and comparing each snapshot included in the second plurality of snapshots to a baseline snapshot of a nominal operating state of a baseline host instance included in the first instance group to determine that the second plurality of snapshots does not indicate any anomalies associated with the first instance group.

8. The method of any of clauses 1-7, wherein a first snapshot included in the first plurality of snapshots includes responses of the first host instance to the first set of queries, and a second snapshot included in the second plurality of snapshots includes responses of the first host instance to the baseline set of queries.

9. The method of any of clauses 1-8, further comprising acquiring a second plurality of snapshots for a second instance group; comparing each snapshot included in the second plurality of snapshots to a baseline snapshot of a nominal operating state of a baseline host instance included in the second instance group to determine a set of snapshot differences; and determining that a second host instance included in the second instance group is operating in an anomalous fashion based on the set of snapshot differences.

10. The method of any of clauses 1-9, wherein the first host instance is operating in an anomalous fashion on account of at least one of a cryptomining attack, a data breach, a denial of service attack, an account or service hijacking, and a malware injection.

11. In some embodiments, one or more non-transitory computer readable media include instructions that, when executed by one or more processors, cause the one or more processors to perform the steps of acquiring a first plurality of snapshots for a first instance group using a first set of queries, wherein each snapshot represents a current operational state of a different host instance included in the first instance group; executing a clustering algorithm based on the first plurality of snapshots to generate a first plurality of clusters; and determining that a first host instance included in the first instance group is operating in an anomalous fashion based on a first cluster included in the first plurality of clusters that is associated with fewer host instances than at least a second cluster included in the first plurality of clusters.

12. The one or more non-transitory computer readable media of clause 11, wherein each host instance comprises a physical compute instance, a virtual machine, or a container.

13. The one or more non-transitory computer readable media of clauses 11 or 12, wherein the first instance group is associated with a cloud-based computing environment, an on-site data center, a distributed computing environment, or a distributed data center.

14. The one or more non-transitory computer readable media of any of clauses 11-13, wherein the first instance group is configured as a consolidated entity for performing autoscaling and management operations.

15. The one or more non-transitory computer readable media of any of clauses 11-14, wherein acquiring the first plurality of snapshots comprises installing agent software on each host instance included in the first instance group; and for each host instance included in the first instance group, transmitting the first set of queries to the agent software installed on the host instance and, in response, receiving a snapshot of a current state of the host instance.

16. The one or more non-transitory computer readable media of any of clauses 11-15, wherein each snapshot included in the first plurality of snapshots includes at least one of a list of processes, a list of command run on table entries, a list of kernel module insertions, and a list of kernel modules.

17. The one or more non-transitory computer readable media of any of clauses 11-16, further comprising, prior to acquiring the first plurality of snapshots, acquiring a second plurality of snapshots for the first instance group using a baseline set of queries; and comparing each snapshot included in the second plurality of snapshots to a baseline snapshot of a nominal operating state of a baseline host instance included in the first instance group to determine that the second plurality of snapshots does not indicate any anomalies associated with the first instance group.

18. The one or more non-transitory computer readable media of any of clauses 11-17, further comprising transmitting the baseline set of queries to a newly-deployed host instance included in the first instance group and, in response, receiving the baseline snapshot of the nominal operating state of the newly-deployed host instance.

19. The one or more non-transitory computer readable media of any of clauses 11-18, wherein the clustering algorithm comprises a k-means clustering algorithm or a k-nearest neighbors algorithm.

20. In some embodiments, a system comprises one or more memories storing instructions; and one or more processors that are coupled to the one or more memories and, when executing the instructions, are configured to acquire a plurality of snapshots for an instance group, wherein each snapshot includes responses from a different host instance included in the instance group to one or more queries; perform one or more clustering operations based on the plurality of snapshots to generate a plurality of clusters; and determine that a first host instance included in the instance group is operating in an anomalous fashion based on a first cluster included in the plurality of clusters that is associated with fewer host instances than at least a second cluster included in the plurality of clusters.

Any and all combinations of any of the claim elements recited in any of the claims and/or any elements described in this application, in any fashion, fall within the contemplated scope of the present embodiments and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method comprising:
   acquiring a first plurality of snapshots for a first instance group that comprises a plurality of host instances that share one or more security behaviors, wherein each snapshot represents a current operational state of a different host instance included in the plurality of host instances;
   performing one or more clustering operations based on the first plurality of snapshots to generate a first plurality of clusters; and
   determining that a first host instance included in the first instance group is operating in an anomalous fashion based on a first cluster included in the first plurality of clusters that is associated with fewer host instances than at least a second cluster included in the first plurality of clusters.

2. The method of claim 1, where each host instance comprises a self-contained execution environment.

3. The method of claim 1, wherein the first instance group is associated with a cloud-based computing environment, an on-site data center, a distributed computing environment, or a distributed data center.

4. The method of claim 1, wherein the first instance group is configured as a consolidated entity for performing autoscaling and management operations.

5. The method of claim 1, wherein each snapshot included in the first plurality of snapshots includes at least one of a list of processes, a list of command run on table entries, a list of kernel module insertions, and a list of kernel modules.

6. The method of claim 1, wherein the first plurality of snapshots is associated with a first set of queries, and further comprising, prior to acquiring the first plurality of snapshots:
   acquiring a second plurality of snapshots for the first instance group using a baseline set of queries; and
   comparing each snapshot included in the second plurality of snapshots to a baseline snapshot of a nominal operating state of a baseline host instance included in the first instance group to determine that the second plurality of snapshots does not indicate any anomalies associated with the first instance group.

7. The method of claim 6, wherein a first snapshot included in the first plurality of snapshots includes responses of the first host instance to the first set of queries, and a second snapshot included in the second plurality of snapshots includes responses of the first host instance to the baseline set of queries.

8. The method of claim 1, further comprising:
acquiring a second plurality of snapshots for a second instance group;
comparing each snapshot included in the second plurality of snapshots to a baseline snapshot of a nominal operating state of a baseline host instance included in the second instance group to determine a set of snapshot differences; and
determining that a second host instance included in the second instance group is operating in an anomalous fashion based on the set of snapshot differences.

9. The method of claim 1, wherein the first host instance is operating in an anomalous fashion on account of at least one of a cryptomining attack, a data breach, a denial of service attack, an account or service hijacking, and a malware injection.

10. One or more non-transitory computer readable media including instructions that, when executed by one or more processors, cause the one or more processors to perform the steps of:
acquiring a first plurality of snapshots for a first instance group that comprises a plurality of host instances that share one or more security behaviors, wherein each snapshot represents a current operational state of a different host instance included in the plurality of host instances;
performing one or more clustering operations based on the first plurality of snapshots to generate a first plurality of clusters; and
determining that a first host instance included in the first instance group is operating in an anomalous fashion based on a first cluster included in the first plurality of clusters that is associated with fewer host instances than at least a second cluster included in the first plurality of clusters.

11. The one or more non-transitory computer readable media of claim 10, wherein each host instance comprises a physical compute instance, a virtual machine, or a container.

12. The one or more non-transitory computer readable media of claim 10, wherein the first instance group is associated with a cloud-based computing environment, an on-site data center, a distributed computing environment, or a distributed data center.

13. The one or more non-transitory computer readable media of claim 10, wherein the first instance group is configured as a consolidated entity for performing autoscaling and management operations.

14. The one or more non-transitory computer readable media of claim 10, wherein acquiring the first plurality of snapshots comprises:
installing agent software on each host instance included in the first instance group; and
for each host instance included in the first instance group, transmitting the first set of queries to the agent software installed on the host instance and, in response, receiving a snapshot of a current state of the host instance.

15. The one or more non-transitory computer readable media of claim 10, wherein each snapshot included in the first plurality of snapshots includes at least one of a list of processes, a list of command run on table entries, a list of kernel module insertions, and a list of kernel modules.

16. The one or more non-transitory computer readable media of claim 10, further comprising, prior to acquiring the first plurality of snapshots:
acquiring a second plurality of snapshots for the first instance group using a baseline set of queries; and
comparing each snapshot included in the second plurality of snapshots to a baseline snapshot of a nominal operating state of a baseline host instance included in the first instance group to determine that the second plurality of snapshots does not indicate any anomalies associated with the first instance group.

17. The one or more non-transitory computer readable media of claim 16, further comprising transmitting the baseline set of queries to a newly-deployed host instance included in the first instance group and, in response, receiving the baseline snapshot of the nominal operating state of the newly-deployed host instance.

18. The one or more non-transitory computer readable media of claim 10, wherein the clustering algorithm comprises a k-means clustering algorithm or a k-nearest neighbors algorithm.

19. A system comprising:
one or more memories storing instructions; and
one or more processors that are coupled to the one or more memories and, when executing the instructions, are configured to:
acquire a first plurality of snapshots for a first instance group that comprises a plurality of host instances that share one or more security behaviors, wherein each snapshot represents a current operational state of a different host instance included in the plurality of host instances;
perform one or more clustering operations based on the first plurality of snapshots to generate a first plurality of clusters; and
determine that a first host instance included in the first instance group is operating in an anomalous fashion based on a first cluster included in the first plurality of clusters that is associated with fewer host instances than at least a second cluster included in the first plurality of clusters.

* * * * *